United States Patent
Shirani-Mehr et al.

(10) Patent No.: US 9,807,723 B2
(45) Date of Patent: Oct. 31, 2017

(54) DETERMINING AN ORDER OF MODULATION FOR EACH TRANSPORT BLOCK BASED ON INITIAL CHANNEL STATE INFORMATION

(75) Inventors: Hooman Shirani-Mehr, Portland, OR (US); Jong-Kae Fwu, Sunnyvale, CA (US); Shafi Bashar, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 254 days.

(21) Appl. No.: 13/992,726

(22) PCT Filed: Mar. 30, 2012

(86) PCT No.: PCT/US2012/031329
§ 371 (c)(1),
(2), (4) Date: Jun. 8, 2013

(87) PCT Pub. No.: WO2013/025258
PCT Pub. Date: Feb. 21, 2013

(65) Prior Publication Data
US 2013/0265972 A1 Oct. 10, 2013

Related U.S. Application Data

(60) Provisional application No. 61/523,080, filed on Aug. 12, 2011.

(51) Int. Cl.
*H04L 5/00* (2006.01)
*H04W 56/00* (2009.01)
(Continued)

(52) U.S. Cl.
CPC .......... *H04W 56/0045* (2013.01); *H04B 3/36* (2013.01); *H04B 7/0413* (2013.01);
(Continued)

(58) Field of Classification Search
CPC .......................... H04L 1/1812; H04L 1/1896
See application file for complete search history.

(56) References Cited

U.S. PATENT DOCUMENTS 8,553,624 B2 * 10/2013 Khan ................... H04B 7/0413
370/329
8,699,436 B2 * 4/2014 Noh ...................... H04L 1/1893
370/229
(Continued)

OTHER PUBLICATIONS

PCT International Search Report and Written Opinion issued in corresponding PCT/US2012/031329 dated Oct. 29, 2012 (9 pages).
(Continued)

*Primary Examiner* — Fan Ng
(74) *Attorney, Agent, or Firm* — Trop Pruner & Hu, P.C.

(57) ABSTRACT

A system for updating channel state information may include a base station wirelessly sending a reference signal to a user device. The bases station may receive channel state information based on the reference signal. Then, the bases station may determine a number of transport blocks to enable, a number of layers to use, and an order of modulation for each transport block based on the channel state information. The bases station may then receive subsequent channel state information from the user device using the determined parameters.

3 Claims, 3 Drawing Sheets

(51) Int. Cl.

| | |
|---|---|
| *H04W 52/34* | (2009.01) |
| *H04W 24/02* | (2009.01) |
| *H04L 1/00* | (2006.01) |
| *H04B 3/36* | (2006.01) |
| *H04B 7/0413* | (2017.01) |
| *H04L 1/18* | (2006.01) |
| *H04W 76/04* | (2009.01) |
| *H04W 48/12* | (2009.01) |
| *H04W 52/14* | (2009.01) |
| *H04W 52/24* | (2009.01) |
| *H04B 7/024* | (2017.01) |
| *H04W 16/14* | (2009.01) |
| *H04W 84/04* | (2009.01) |

(52) U.S. Cl.
CPC .......... *H04L 1/0003* (2013.01); *H04L 1/0026* (2013.01); *H04L 1/1812* (2013.01); *H04L 5/001* (2013.01); *H04L 5/0032* (2013.01); *H04L 5/0057* (2013.01); *H04L 5/0073* (2013.01); *H04L 5/0091* (2013.01); *H04W 24/02* (2013.01); *H04W 48/12* (2013.01); *H04W 52/34* (2013.01); *H04W 76/046* (2013.01); *H04B 7/024* (2013.01); *H04W 16/14* (2013.01); *H04W 52/146* (2013.01); *H04W 52/241* (2013.01); *H04W 84/045* (2013.01)

(56) References Cited

U.S. PATENT DOCUMENTS

| | | | | |
|---|---|---|---|---|
| 8,811,353 | B2* | 8/2014 | Chen | H04L 5/0053 370/329 |
| 8,953,522 | B2* | 2/2015 | Han | H04B 7/0426 370/310.2 |
| 2007/0104283 | A1* | 5/2007 | Han | H04B 7/0408 375/260 |
| 2008/0175194 | A1* | 7/2008 | Blanz | H04J 13/0044 370/329 |
| 2008/0291888 | A1* | 11/2008 | Maret | H04L 5/0016 370/342 |
| 2009/0232158 | A1* | 9/2009 | Frank et al. | 370/466 |
| 2010/0118817 | A1 | 5/2010 | Damnjanovic | |
| 2010/0303016 | A1* | 12/2010 | Jin et al. | 370/328 |
| 2011/0019637 | A1* | 1/2011 | Ojala et al. | 370/329 |
| 2011/0035639 | A1* | 2/2011 | Earnshaw | H04L 1/1812 714/748 |
| 2011/0110455 | A1 | 5/2011 | Gaal | |
| 2011/0149765 | A1 | 6/2011 | Gorokhov | |
| 2011/0176627 | A1* | 7/2011 | Wu et al. | 375/260 |
| 2011/0249578 | A1* | 10/2011 | Nayeb Nazar | H04L 1/0027 370/252 |
| 2011/0299484 | A1* | 12/2011 | Nam et al. | 370/329 |
| 2012/0069833 | A1* | 3/2012 | Molnar | H04B 7/0626 370/342 |
| 2012/0106388 | A1* | 5/2012 | Shimezawa | H04B 7/024 370/252 |

OTHER PUBLICATIONS

Intel Corporation, "Discussions of UE-RS Based Open Loop MIMO," 3GPP TSG RAN WGI Meeting #65, R1-111597, May 9-13, 2011.

EP search report in corresponding EP application No. 12824293.0 dated Jul. 7, 2015.

Intel Corporation: "Discussions of UCI-only Transmission on PUSCH", 3GPP Draft; R1-112232 Discussions of UCI-Only Transmission on PUSCH, 3rd Generation Partnership Project (3GPP), Mobile Competence Centre; 650, Route Des Lucioles; F-06921 Sophia-Antipolis Cedex ; France, vol. RAN WG1, No. Athens, Greece; Aug. 22, 2011, Aug. 16, 2011 (Aug. 16, 2011), XP050537394, [retrieved on Aug. 16, 2011].

Qualcomm Incorporated: "CQI Only Transmission on PUSCH", 3GPP Draft; R1-106368 CQI Only TXMN on PUSCH, 3rd Generation Partnership Project (3GPP), Mobile Competence Centre ; 650, Route Des Lucioles; F-06921 Sophia-Antipolis Cedex ; France, vol. RAN WG1, No. Jacksonville, USA; Nov. 15, 2010, Nov. 9, 2010 (Nov. 9, 2010), XP050467023, [retrieved on Nov. 9, 2010].

ZTE: "Remaining issues of UCI-only transmission", 3GPP Draft; R1-11 0823 Remaining Issues of CQI Only Transmission, 3rd Generation Partnership Project (3GPP), Mobile Competence Centre ; 650, Route Des Lucioles ; F-06921 Sophia-Antipolis Cedex ; France, vol. RAN WG1, No. Taipei, Taiwan; Feb. 21, 2011, Feb. 17, 2011 (Feb. 17, 2011), XP050490766, [retrieved on Feb. 17, 2011].

Huawei: "Remaining issues in aperiodic CQI-only PUSCH", 3GPP Draft; R1-11 0625_Remaining Issues in Aperiodic CQI-ONL Y PUSCH, 3rd Generation Partnership Project (3GPP), Mobile Competence Centre; 650, Route Des Lucioles; F-06921 Sophia-Antipolis Cedex ; France, vol. RAN WG1, No. Taipei, Taiwan; Feb. 21, 2011, Feb. 15, 2011 (Feb. 15, 2011), XP050490480, [retrieved on Feb. 15, 2011].

Renesas Mobile Europe LTD: "UCI-only PUSCH transmission enhancements", 3GPP Draft; R1-112700, 3rd Generation Partnership Project (3GPP), Mobile Competence Centre ; 650, Route Des Lucioles ; F-06921 Sophia-Antipolis Cedex ; France, vol. RAN WG1, No. Athens, Greece; Aug. 22, 2011, Aug. 17, 2011 (Aug. 17, 2011), XP050537793, [retrieved on Aug. 17, 2011].

\* cited by examiner

| I_MCS0 | I_MCS1 | MODULATION ORDER, FIRST CW | MODULATION ORDER, SECOND CW |
|---|---|---|---|
| 29 | 1 | 2 | DISABLED |
| 29 | 2 | DISABLED | 2 |
| 29 | 3 | 4 | DISABLED |
| 29 | 4 | DISABLED | 4 |
| 29 | 5 | 6 | DISABLED |
| 29 | 6 | DISABLED | 6 |
| 29 | 7 | 2 | 2 |
| 29 | 8 | 2 | 4 |
| 29 | 9 | 2 | 6 |
| 29 | 10 | 4 | 2 |
| 29 | 11 | 4 | 4 |
| 29 | 12 | 4 | 6 |
| 29 | 13 | 6 | 2 |
| 29 | 14 | 6 | 4 |
| 29 | 15 | 6 | 6 |

DETERMINING AN ORDER OF MODULATION FOR EACH TRANSPORT BLOCK BASED ON INITIAL CHANNEL STATE INFORMATION

This relates generally to sending data over wireless networks. This application claims priority to provisional application 61/523,080, filed Aug. 12, 2011, which application is hereby expressly incorporated herein.

BACKGROUND

As mobile and wireless networks grow in popularity, radio and wireless communication standards must adapt to meet ever increasing bandwidth requirements and user demand. Such standards include the Third Generation Partnership Project (3GPP) Long Term Evolution (LTE) and Long Term Evolution-Advanced (LTE-Advanced) systems.

Using these protocols, various devices may use wireless communication schemes to communicate with a data network. For example, each device may establish a wireless connection to a local base station in order to access a broader data network. Thus, multiple devices may communicate with each other by accessing the data network through multiple base stations.

BRIEF DESCRIPTION OF THE DRAWINGS

Some embodiments are described with respect to the following figures.

DETAILED DESCRIPTION

In wireless communications, one area of particular interest may be the calculation and reporting of channel state information (CSI) between a user device and a base station. To this end, calculating CSI may enable certain optimizations to be performed during communication. For example, knowledge of CSI may affect the determination of certain transmission parameters, power requirements, bandwidth allocation, modulation schemes, and other variables for wireless communication.

However, as data throughputs increase, so do the bandwidth requirements of reporting CSI. Thus, in accordance with one or more embodiments, CSI may be sent to the base station using a determined number of transport blocks, a determined number of layers, and determined modulation schemes based on calculated channel conditions. Such determinations may enable a wireless network configuration to leverage relatively good channel conditions when reporting CSI.

Figures 1, 2:
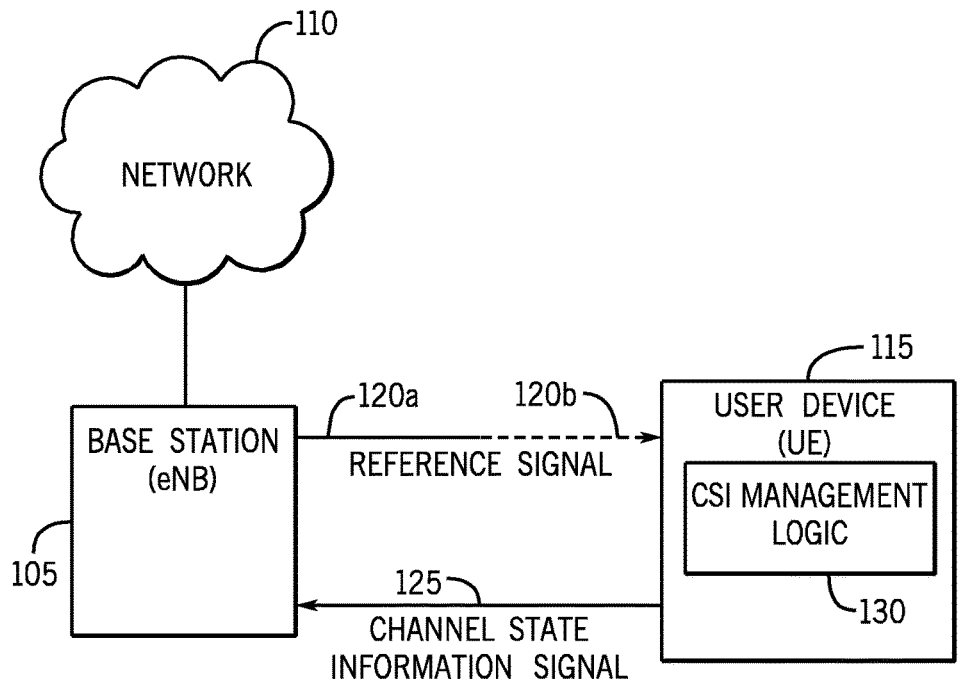
FIG. 1 is a schematic depiction of an example network configuration in accordance with one or more embodiments.
FIG. 2 is a depiction of a table used by an example network configuration in accordance with one or more embodiments.

FIG. 1 represents a system 100 for updating channel state information in a wireless network according to one or more embodiments. The system may include a base station 105 in wireless communication with a user device 115. Thus, the user device 115 may be connected to the wireless network 110 through the base station 105. In wireless computer networking, the base station 105 may be a radio receiver and/or transmitter that serves as a hub for a local wireless network. In one or more embodiments, the base station 105 may act as a gateway between a wired network (not shown) and a wireless network 110 and may typically include a transmitter and a wireless router.

The user device 115 may be any electronic device capable of communication over a wireless network 110. For example, the user device 115 may include a desktop computer, laptop computer, mobile phone, tablet personal computer, personal digital assistant, digital camera, and/or any other electronic device. Furthermore, while FIG. 1 illustrates only one user device 115, it should be understood that any number of user devices may be in communication with the base station 105, and therefore to the wireless network 110.

In one or more embodiments, in order to establish communication between the base station 105 and the user device 115, channel conditions may need to be determined between the base station 105 and the user device 115. Thus, the base station 105 may send a reference signal 120a through the wireless network 110 to the user device 115. Channel state information (CSI) management logic 130 in the user device 115 may then analyze the received reference signal 120b. For instance, the CSI management logic 130 may compare characteristics of the received reference signal 120b with characteristics of the reference signal 120a when it was initially sent by the base station 105. The CSI management logic 130 may then use any determined differences between the received reference signal 120b and the sent reference signal 120a to calculate channel state conditions. Subsequently, the user device 115 may send back a signal to the base station 105 containing the calculated CSI 125.

CSI 125 may refer to the channel properties of a wireless communication link between the base station 105 and the user device 115. In general, CSI may describe signal propagation characteristics, such as the effects of signal scattering, fading, and power decay with distance. In wireless communications, CSI may enable systems to adapt data transmission to current channel conditions to achieve a certain degree of reliability balanced with a desired rate of data transfer. In one or more embodiments, CSI may include channel quality indicator (CQI) and precoding matrix indicator (PMI) reports.

The user device 115 may communicate with the base station 105 using any wireless protocols. For example, the two devices may communicate using any of the 802.11 wireless standards, Bluetooth, Third Generation Partnership Project (3GPP) Long Term Evolution (LTE), and/or LTE-Advanced.

In one or more embodiments the system 100 depicted in FIG. 1 may operate under the LTE and/or LTE-Advanced standard (hereinafter referred to as LTE). In LTE, the base station 105 may be referred to as evolved Node B (eNB), and the user device 115 may be referred to as user equipment (UE). Additionally, communication directed from the base station 105 to the user device 115 may be referred to as downlink communication while communication from the user device 115 to the base station 105 may be referred to as uplink communication.

In LTE, a transport block may be a specified amount of data that can be transmitted over a particular period of time. In general, the transport block size may depend on various factors such as bandwidth requirements and availability of certain resources. A modulation scheme may be the method by which certain properties of a signal may be varied to transmit data. Typically, higher-order modulation schemes may provide a higher transfer rate but suffer from an increase in error rate and susceptibility to interference compared to lower-order modulation. In other words, a higher order modulation scheme may provide more data transfer bandwidth but less reliability. The number of transport blocks together with the modulation scheme and other parameters associated with a particular transmission may provide the modulation and coding scheme (MCS) for the transmission.

Additionally, during transmission, multiple data streams may be used, which may be referred to as layers. To this end, the number of layers employed during transmission may correspond to the rank of the transmission. For example, a rank 2 transmission may employ two layers.

Furthermore, according to the current LTE specification, the physical uplink shared channel (PUSCH) may be used to carry or transmit user data. In some circumstances, PUSCH may be used to carry CSI-only data. In these situations, support of CSI-only transmission over PUSCH may be restricted to only certain modulation and coding schemes (MCS) and a certain number of layers. For instance, only one transport block using only quadrature phase-shift keying (QPSK) modulation over one layer may currently be supported for CSI-only transmission over PUSCH. Moreover, LTE may support a communication method known in the art as carrier aggregation. In carrier aggregation, multiple component carriers or channels may be combined to increase bandwidth for data transmission. As such, when using carrier aggregation, CSI data may be reported for each component carrier, thereby increasing bandwidth requirements for CSI reporting itself when compared to using only one channel.

An implication of such restrictions may include circumstances where current systems are unable to take full advantage of good channel conditions. For example, good channel conditions may enable the support of higher order modulation and a greater number of layers for CSI-only transmission. However, the restrictions described above may prevent the ability to adopt such measures.

Thus, in one or more embodiments, the system 100 illustrated in FIG. 1 may provide a framework for varying the MCS and number layers during CSI-only transmission over PUSCH. Depending on the channel state conditions calculated by the CSI Management Logic 130 in the user device 115, the base station 105 may determine the MCS (i.e., the number of transport blocks and the order of modulation for each transport block) and transmission rank for the CSI transmission.

For example, the base station 105 may include Modulation and Coding Scheme (MCS) Logic 108 to determine that channel conditions permit more than one layer to be used. In another example, the MCS Logic 108 may determine that channel state conditions permit two transport blocks to be mapped to two or more layers using the same modulation scheme. In yet another example, the MCS Logic 108 may determine that channel state conditions permit two transport blocks to be mapped to two or more layers using different orders of modulation. One of ordinary skill in the art understands that the above examples are not limiting and that any combination of the number of transport blocks, modulation schemes, and transmission layers are also contemplated within the present disclosure.

Furthermore, because the current LTE specification uses only one combination of MCS and transmission rank (i.e., one transport block, QPSK modulation, and one layer) for CSI-only transmission over PUSCH, no additional signaling is required between the user device 115 and the base station 105 to indicate any particular combination of MCS and transmission rank. Therefore, in order to implement the above examples, further signaling schemes may be included to designate particular combinations of MCS and transmission ranks. Such additional signaling may not be supported in current LTE specifications.

Therefore, FIG. 2 may represent a signaling table 200 including multiple signaling indices, represented by I-MCS0 and I_MCS1, which may be used by the system 100 to signal various combinations of MCS and transmission ranks. In one or more embodiments, the table 200 may be added to the current LTE specification to increase bandwidth capabilities of PUSCH for CSI-only transmission. Thus, the signaling indices in the table 200 may provide a framework for spatial multiplexing with link adaptation in transmitting CSI-only data over PUSCH.

Referring to the signaling table 200, rows 1-6 may correspond to a CSI-only transmission over PUSCH having one transport block mapped to two layers. For example, row 1 may correspond to having the first transport block enabled and the second transport block disabled. Furthermore, the modulation order for the first transport block may be 2.

Additionally, rows 7, 11, and 15 may correspond to CSI-only transmissions over PUSCH having two transport blocks mapped to two or more layers with the same modulations schemes. For example, row 11 may correspond to having both the first transport block and the second transport block enabled. Moreover, the transport blocks may each have a modulation order of 4 and may be mapped to two or more layers.

Finally, rows 8-10 and 12-14 may correspond to CSI-only transmissions over PUSCH having two transport blocks mapped to two or more layers with different modulation schemes. For instance, row 14 may correspond to having both the first transport block and the second transport block enabled. Additionally, the first transport block may have a modulation order of 6 while the second transport block may have a modulation order of 4. Furthermore, the transport blocks may be mapped to two or more layers. It should be noted that one of ordinary skill in the art understands that various other combinations of the number of transport blocks, number of layers, and modulations schemes are also possible in addition to those illustrated in FIG. 2.

Figure 3:
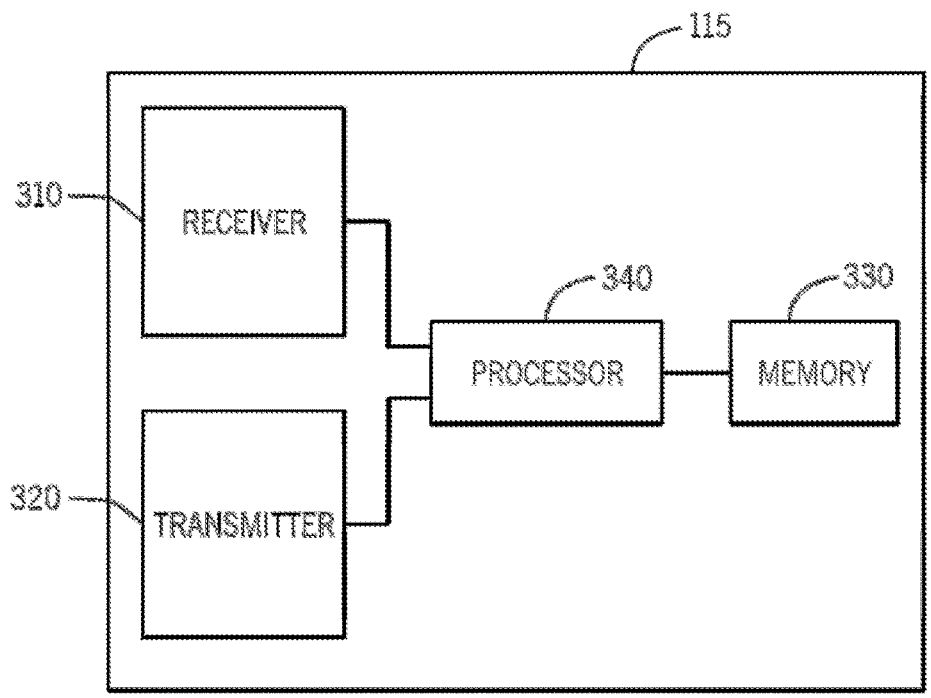
FIG. 3 is a schematic depiction of an example user device in accordance with one or more embodiments.

FIG. 3 represents a system depiction of the user device 115 of FIG. 1. The user device may include a receiver 310 for receiving data and a transmitter 320 for transmitting data. In one or more embodiments, the receiver 310 and the transmitter 320 may be combined to form a transceiver capable of both receiving and transmitting data. For example, the receiver 310 may receive the reference signal 120a-b from the base station 105 while the transmitter 320 may transmit the CSI signal 125 back to the base station 105.

Additionally, the user device 115 may also include a memory 330 for storing instructions and a processor 340 for executing those instructions. In one or more embodiments, CSI Management Logic 130 (not shown) may include the processor 340 and memory 330 or may be otherwise in communication with the processor 340 and the memory 330. In other embodiments, the CSI Management Logic 130 may be a program stored in the memory 330, and thereby provide instructions for the processor 340 to execute. As such, the processor 340 may carry out instructions from the CSI Management Logic 130 to calculate channel state conditions as described above with reference to FIG. 1.

While FIG. 3 illustrates only one of each component, it should be understood that multiple instances of these components are also contemplated within the present disclosure.

For example, the user device 115 may also include more than one processor and more than one memory. Furthermore, the user device 115 may also include multiple storage devices.

Figure 4:
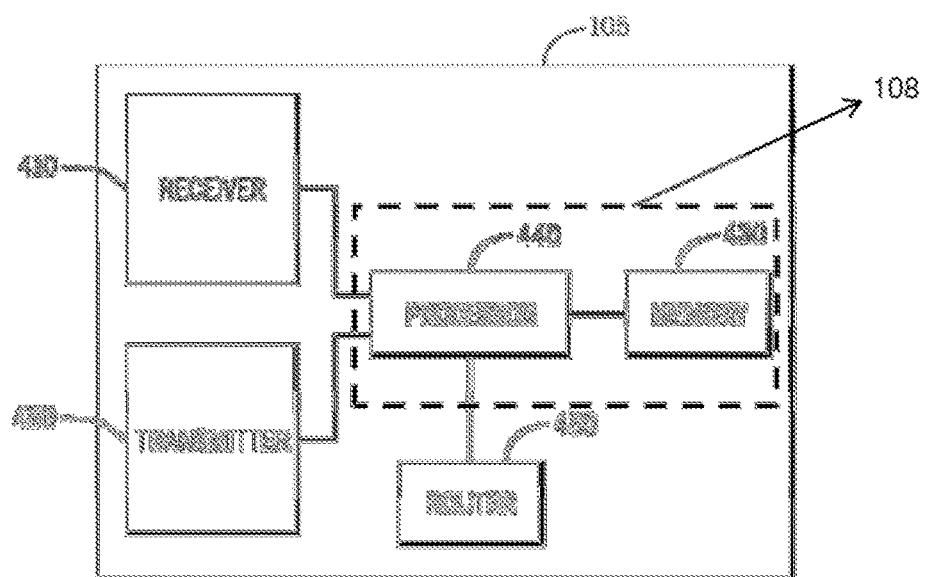
FIG. 4 is a schematic depiction of an example base station in accordance with one or more embodiments.

Similarly, FIG. 4 represents a system depiction of an example base station 105 that may be used to perform the calculating of the CSI. Thus, the base station 105 may include similar components to those illustrated in the user device 115 of FIG. 3. Specifically, the base station 105 may also include a receiver 410, and transmitter 420, a processor 440, and memory 430. Additionally, the base station 105 may also include a router 450 to route communication between various user devices. In one or more embodiments, the memory 430 may store the table 200 illustrated in FIG. 2.

Furthermore, the base station 105 may also include a MCS Logic 108 in communication with the processor 440 and memory 460. In one or more embodiments, MCS Logic 108 may include the processor 440 and memory 430. In other embodiments, the MCSLogic 130 may be a program stored in the memory 430, and thereby provide instructions for the processor 440 to execute. As such, the processor 440 may carry out instructions from the MCS Logic 108 to determine CSI signaling as described above with reference to FIG. 1.

Figure 5:
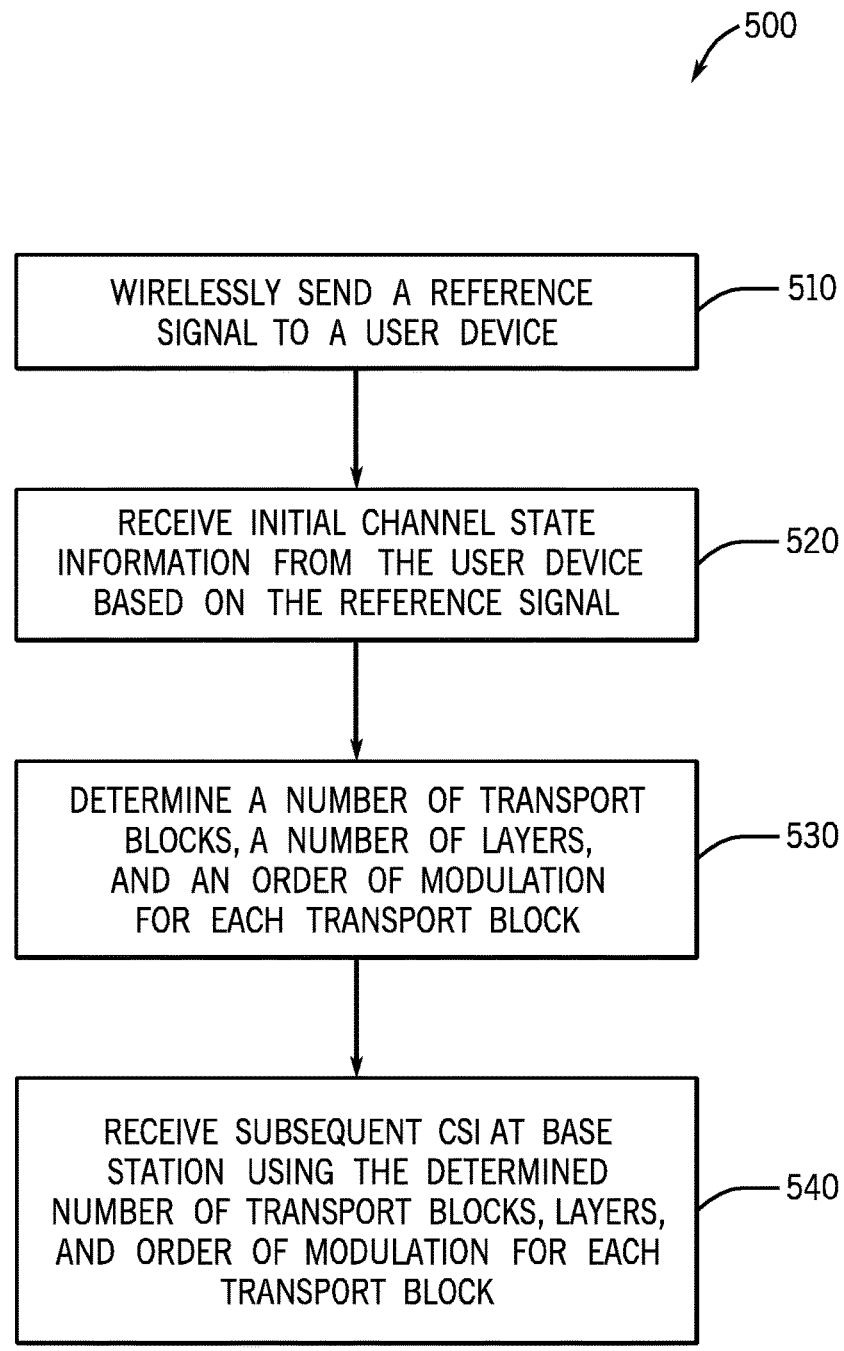
FIG. 5 is a flow chart in accordance with one or more embodiments.

FIG. 5 represents a flow diagram depicting a method 500 for updating channel state information in a wireless network according to one or more embodiments. The method may begin in step 510 when a user device wirelessly receives a reference signal, from a base station.

Then, in step 520, the received reference signal may be analyzed to calculate channel state information. As previously discussed, characteristics of the reference signal when it is received may be compared with the characteristics of the reference signal when it was sent. Any determined differences may be used in the calculation of the channel conditions.

In step 530, after the CSI has been calculated, the base station 105 (e.g., the MCS Logic 108) may determine a particular combination of MCS and transmission rank. In other words, the base station 105 may determine a number of transport blocks, a number of layers, and an order of modulation for each transport block to use in transmitting channel state information back to the base station 105. In one or more embodiments, the MCS Logic 108 may perform a lookup to the table 200 in FIG. 2 to decide on appropriate signaling to indicate to the user device 115 the determined MCS and transmission rank.

Finally, in step 540, the CSI may be sent back to the base station using the determined number transport blocks, number of layers, and modulation scheme for each transport block.

Instructions of software described above (including the steps described in FIG. 5) may be loaded for execution on a processor (such as the processor illustrated in FIG. 3 and/or FIG. 4) A processor can include a microprocessor, microcontroller, processor module or subsystem, programmable integrated circuit, programmable gate array, or another control or computing device. As used here, a "processor" can refer to a single component or to plural components (e.g., one CPU or multiple CPUs).

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

The following clauses and/or examples pertain to further embodiments:

One embodiment may include a method including: sending wirelessly, from a base station, a reference signal to a user device; receiving initial channel state information from the user device based on the reference signal; determining a number of transport blocks to enable, a number of layers to use, and an order of modulation for each transport block based on the initial channel state information; and receiving subsequent channel state information from the user device using the determined number of transport blocks, the determined number of layers, and the determined order of modulation for each transport block.

The method may also include that the determined number of transport blocks to enable is one, and the determined number of layers to use is two. The method also include that the determined number of transport blocks to enable is two, the determined number of layers to use is at least two, and the determined order of modulation for each transport block is the same. The method of may also include that the determined order of modulation for each transport block is greater than 4. The method may also include that the determined number of transport blocks to enable is two, the determined number of layers to use is at least two, and the determined order of modulation for each transport block is different. Additionally, the method may also include that the determined order of modulation for each transport block is greater than 4.

Furthermore, the method may also include that the initial channel state information comprises a channel quality indicator and a precoded matrix indicator. The method may also include that communication with the user device is performed using a plurality of channels, and wherein a particular channel state information signal comprises information pertaining to channel conditions of each of the plurality of channels. The method may also include that the subsequent channel state information is sent back to the base station over a physical uplink shared channel during a channel state information-only transmission.

Another embodiment may also be at least one machine readable medium including a plurality of instructions that in response to being executed by a computer device, cause the computer device to carry out the above-described method.

A further embodiment may be a system including: a transmitter; a receiver to wirelessly receive a reference signal over one or more wireless channels from a base station; a memory storing instructions; a processor to execute the instructions to: calculate initial channel state information of the one or more wireless channels by analyzing the reference signal; and receive a determined number of transport blocks to enable, a determined number of layers to use, and a determined order of modulation for each transport block based on the initial channel state information, wherein the transmitter is to wirelessly send subsequent channel state information to the base station using the determined number of transport blocks, the determined number of layers, and the determined order of modulation for each transport block.

The system may also include a display. The system may also include that the subsequent channel state information is sent over a physical uplink shared channel during an aperiodic channel state information-only transmission. The system may also include that analyzing the reference signal includes comparing first characteristics of the reference signal when it was initially sent to second characteristics of the reference signal after it has been received.

Another embodiment may be a base station, including: a transceiver to wirelessly receive initial channel state information from a user device; and a channel state information logic having a memory storing instructions, and a processor to execute the instructions to: determine a number of transport blocks to enable, a number of layers to use, and an order of modulation for each transport block based on the initial channel state information, wherein the transceiver is to receive subsequent channel state information from the user device using the determined number of transport blocks, the determined number of layers, and the determined order of modulation for each transport block.

The base station may also include that the memory further stores a table indexing plural combinations of the number of transport blocks, the number of layers, and the order of modulation for each transport block. The base station may also include that the channel state information logic is to identify a particular combination from the table and that the base station communicates with the user device using a Long-Term Evolution (LTE) standard. Moreover, the base station may also include that the table is to index the plural combinations using a first Index Modulation and Coding Scheme (IMCS) and a second IMCS. Finally, the base station may also include that the first IMCS value is 29.

What is claimed is:

1. A system comprising:
a transmitter;
a receiver to wirelessly receive a reference signal over one or more wireless channels from a base station;
a memory storing instructions;
a processor to execute the instructions to:
calculate initial channel state information of the one or more wireless channels by analyzing the reference signal; and
receive a determined a number of transport blocks to enable, based on the initial channel state information, a determined number of layers to use, and a determined order of modulation for each transport block wherein the transmitter is to wirelessly send subsequent channel state information to the base station using the determined number of transport blocks, the determined number of layers, and the determined order of modulation for each transport block; and
wherein analyzing the reference signal comprises comparing first characteristics of the reference signal as sent initially to second characteristics of the reference signal after it has been received.

2. The system of claim 1 further comprising a display.

3. The system of claim 1, wherein the subsequent channel state information is sent over a physical uplink shared channel during an aperiodic channel state information-only transmission.

* * * * *